(No Model.)
R. W. SILVEY.
COMBINED BLOWER LIFTER, AND GAS LIGHTER.
No. 248,805. Patented Oct. 25, 1881.
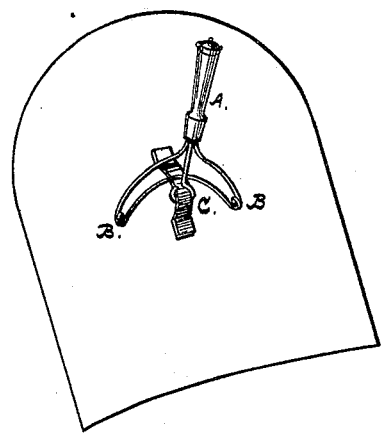
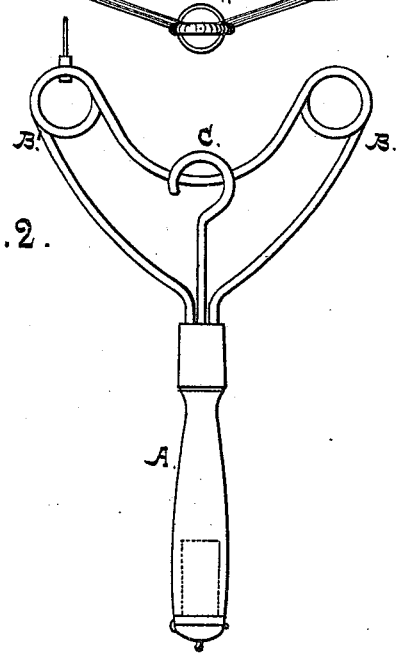
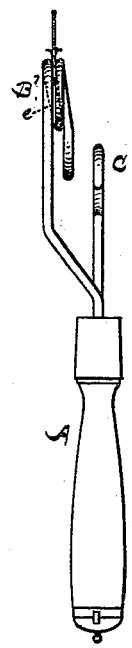
Witnesses:
Inventor:
Robert W. Silvey
By his Attys.

UNITED STATES PATENT OFFICE.

ROBERT W. SILVEY, OF SAN FRANCISCO, CALIFORNIA.

COMBINED BLOWER-LIFTER AND GAS-LIGHTER.

SPECIFICATION forming part of Letters Patent No. 248,805, dated October 25, 1881.

Application filed May 13, 1881. (No model.)

*To all whom it may concern:*

Be it known that I, ROBERT W. SILVEY, of the city and county of San Francisco, in the State of California, have made and invented a new and useful Combined Blower-Lifter and Gas-Lighter for Household Purposes; and I do hereby declare that the following is a full, clear, and exact description of the same, reference being had to the accompanying drawings.

My invention relates to a tool or implement for household use.

It has for its object to provide a convenient and useful device for handling grate-blowers when heated, and for lighting and extinguishing gas-burners.

It consists, essentially, of two forked arms or horns extending forward and projecting laterally from the end of a suitable handle, and with a hook or other device for grasping or engaging with the handle of the blower projecting from the point where these arms spring from their handle. In the end of one arm a slot or socket is formed to receive and serve as a means for turning the key of the gas-burner, and in or upon the end of the other arm is a device to receive and hold the end of a lighted match. In the end of the handle there is provided, for convenience, a case or safe to contain matches.

In the accompanying drawings, which show the form I now employ in constructing my improved device, Figure 1 is a sectional view, showing my device used as a blower-lifter. Fig. 2 is a front plan view. Fig. 3 is a side view taken from the left-hand side of Fig. 2. Fig. 4 is an end view.

To the end of a suitable handle, A, I fix two arms or horns, B B', so that they extend forward, and project also on each side from the end of the handle, like the tines of a fork. In line with the handle, and at the point where these arms diverge, I arrange a hook, C, in such position that it can be passed through the handle of the blower to be lifted, and when so acting the arms B B' will extend laterally and bear against the blower on each side of the handle. The arms B B' are not in line with the center or longitudinal axis of the handle A, but they are depressed, so as to be below the hook, as will be seen by reference to Fig. 3 of the drawings. This permits the hook C to be readily introduced under and engaged with the handle of the blower, and easily disengaged and removed from it without bringing the handle A too near to a perpendicular position and in too close proximity to the face of the blower. The position of the lifter when the hook is engaged with the blower-handle will be understood from Fig. 1 of the drawings. When used for this purpose the two arms B B' bear against the face of the blower equally on both sides of the handle, so that they hold the blower stiffly while it is being lifted and carried about, and no swinging or lateral movement can take place during such time. In forming these arms B B' they can be cheaply and strongly made from a single piece of wire bent into shape, so as to give two projecting horns, and then securely fixed at the ends to the handle, the projecting horns being stiffened by forming the wire at these points into one or more coils, as shown. In the end of one of these horns I provide a slot or socket, d, which can be a separate piece of metal soldered or otherwise fixed in place; or, in a more simple manner, it can be formed by spreading apart the coil produced at the end of the wire horn, so as to leave a slot of sufficient width to permit the insertion of the gas-burner key. This will be seen in Fig. 4 of the drawings. Upon the end of the other arm or horn, B', I provide a device to receive and hold a match or short taper, so that the tool serves both to turn on and to light the gas, and the ordinary friction-match can be used in the tool. This device to hold the match consists of the spring-clip e, secured to the end of the arm, and having jaws to receive and grasp the match, which is lighted and then inserted between them.

As thus constructed my improved device forms a means for readily lifting and handling heated blowers of grates or fire-places, and presents, also, a tool or utensil for lighting and extinguishing gas-burners, and in such form it provides a convenient and highly useful tool for household purposes.

For convenience I place in the end of the handle A a match case or safe, to hold the matches or tapers to be used with the lighter.

Having thus fully described my invention, what I claim, and desire to secure by Letters Patent, is—

1. The combination, together, of the handle A, the hook C, and the projecting and laterally-diverging arms or horns B B' upon opposite sides of, and extending beyond, the said hook, the whole forming the herein-described household tool or implement, for use as set forth.

2. In combination with the handle A, the projecting and diverging arms or horns B B', having upon the end of one the slot or socket d, and upon the end of the other one the clip e, and the hook C, arranged midway between the said arms and in line with the handle A, substantially as herein described, the whole forming a combined tool or implement for household use, as set forth.

ROBERT W. SILVEY.

Witnesses:
EDWARD E. OSBORN,
W. F. CLARK.